(12) United States Patent
Whiteman et al.

(10) Patent No.: US 10,006,635 B2
(45) Date of Patent: Jun. 26, 2018

(54) APPARATUS AND A METHOD OF CONTROLLING THE SUPPLY OF FUEL TO A COMBUSTION CHAMBER

(71) Applicants: ROLLS-ROYCE PLC, London (GB); ROLLS-ROYCE CONTROLS AND DATA SERVICES LIMITED, Derby (GB)

(72) Inventors: Michael Whiteman, Loughborough (GB); Luca Romeo, Derby (GB); Yong Qin, Derby (GB); Paul Thornton, Derby (GB)

(73) Assignees: ROLLS-ROYCE plc, London (GB); ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 1165 days.

(21) Appl. No.: 14/483,787

(22) Filed: Sep. 11, 2014

(65) Prior Publication Data
US 2015/0345791 A1    Dec. 3, 2015

(30) Foreign Application Priority Data

Sep. 27, 2013   (GB) .................................. 1317175.6

(51) Int. Cl.
*F23R 3/28*   (2006.01)
*F23R 3/00*   (2006.01)
(Continued)

(52) U.S. Cl.
CPC .................. *F23R 3/28* (2013.01); *F02C 9/34* (2013.01); *F23N 5/003* (2013.01); *F23N 5/006* (2013.01);
(Continued)

(58) Field of Classification Search
CPC .. F23R 3/28; F23R 3/002; F23R 3/346; F23N 5/003; F23N 5/006; F23N 2041/20;
(Continued)

(56) References Cited

U.S. PATENT DOCUMENTS

| 5,024,055 A | 6/1991 | Sato et al. |
| 5,261,222 A | 11/1993 | Napoli |

(Continued)

FOREIGN PATENT DOCUMENTS

| EP | 2237354 A1 | 10/2010 |
| EP | 2 584 176 A2 | 4/2013 |

(Continued)

OTHER PUBLICATIONS

Apr. 28, 2014 Search Report issued in GB Application No. 1317175.6.

(Continued)

*Primary Examiner* — Jason T Newton
(74) *Attorney, Agent, or Firm* — Oliff PLC

(57) ABSTRACT

Combustion chamber includes a primary stage fuel burner to supply fuel into a primary combustion zone and secondary stage fuel burner supplies fuel into a secondary combustion zone. A sensor is positioned downstream from combustion chamber measuring concentration of one or more compounds. The sensor sends measurements of the concentration of compounds to a processor. The processor compares the measured concentration of the compound with a first threshold value and a second threshold value. The processor supplies more fuel to the primary stage fuel burner if the measured concentration is higher than the first threshold value, supplies more fuel to the secondary stage fuel burner if the measured concentration is higher than the second threshold value, maintaining fuel supply to the primary and secondary stage fuel burners if the measured concentration (Continued)

is lower than the first threshold value and lower than the second threshold value.

18 Claims, 3 Drawing Sheets

(51) Int. Cl.
 *F02C 9/34* (2006.01)
 *F23N 5/00* (2006.01)
 *F23R 3/34* (2006.01)
(52) U.S. Cl.
 CPC .............. *F23R 3/002* (2013.01); *F23R 3/346* (2013.01); *F23N 2041/20* (2013.01); *F23N 2900/05001* (2013.01); *F23N 2900/05002* (2013.01); *F23N 2900/05003* (2013.01)
(58) Field of Classification Search
 CPC . F23N 2900/05001; F23N 2900/05003; F23N 2900/05002
 USPC .......................................................... 60/776
 See application file for complete search history.

(56) References Cited

U.S. PATENT DOCUMENTS

| | | |
|---|---|---|
| 5,327,718 A | 7/1994 | Iwata et al. |
| 5,442,922 A | 8/1995 | Dyer et al. |
| 5,599,179 A | 2/1997 | Lindner et al. |
| 5,937,634 A | 8/1999 | Etheridge et al. |
| 6,105,360 A | 8/2000 | Willis |
| 6,912,480 B2 | 6/2005 | Black |
| 6,955,039 B2 * | 10/2005 | Nomura ................. F01D 17/162 60/39.27 |
| 6,976,351 B2 * | 12/2005 | Catharine ................ F02C 9/00 60/39.281 |
| 7,188,019 B2 * | 3/2007 | Nomura .................... F02C 9/28 60/39.281 |
| 7,269,952 B2 | 9/2007 | Arar et al. |
| 7,284,378 B2 * | 10/2007 | Amond, III ............... F02C 9/34 60/39.27 |
| 7,302,334 B2 | 11/2007 | Hook et al. |
| 7,441,398 B2 * | 10/2008 | Ziminsky ................ F02C 7/222 60/39.281 |
| 7,805,922 B2 | 10/2010 | Bland |
| 7,914,747 B1 | 3/2011 | Kraemer |
| 9,354,618 B2 * | 5/2016 | Chandler .................. F02C 9/40 |
| 9,671,797 B2 * | 6/2017 | Chandler ............... G05D 17/00 |
| 9,677,686 B2 * | 6/2017 | Solacolu ................. F02C 7/228 |
| 2004/0107701 A1 * | 6/2004 | Miyake .................. F23N 1/022 60/772 |
| 2004/0255594 A1 | 12/2004 | Baino et al. |
| 2006/0260319 A1 | 11/2006 | Ziminsky et al. |
| 2007/0089425 A1 | 4/2007 | Motter et al. |
| 2007/0113560 A1 | 5/2007 | Steber et al. |
| 2007/0157701 A1 | 7/2007 | Black |
| 2010/0095649 A1 | 4/2010 | Blouch et al. |
| 2010/0170219 A1 | 7/2010 | Venkataraman et al. |
| 2010/0170254 A1 | 7/2010 | Venkataraman et al. |
| 2010/0174466 A1 | 7/2010 | Davis, Jr. et al. |
| 2011/0265487 A1 * | 11/2011 | Gauthier ................ F02C 7/228 60/773 |
| 2012/0185144 A1 | 7/2012 | Draper |
| 2013/0091857 A1 * | 4/2013 | Thornton .................. F02C 9/34 60/776 |
| 2013/0098054 A1 * | 4/2013 | Guethe ................... F02C 9/263 60/773 |

FOREIGN PATENT DOCUMENTS

| | | |
|---|---|---|
| JP | 62-67241 A | 3/1987 |
| WO | 2005/038214 A1 | 4/2005 |
| WO | 2008/052867 A1 | 5/2008 |
| WO | 2011064343 A1 | 6/2011 |

OTHER PUBLICATIONS

Mar. 5, 2015 Search Report issued in European Application No. 14184380.

\* cited by examiner

APPARATUS AND A METHOD OF CONTROLLING THE SUPPLY OF FUEL TO A COMBUSTION CHAMBER

FIELD OF THE INVENTION

The present invention relates to an apparatus for controlling the supply of fuel to a combustion chamber and a method of controlling the supply of fuel to a combustion chamber and in particular the present inventions relates to an apparatus for controlling the supply of fuel to a gas turbine engine combustion chamber and a method of controlling the supply of fuel to a gas turbine engine combustion chamber.

BACKGROUND TO THE INVENTION

Gas turbine engine combustion chambers have been developed to limit the production of undesirable combustion product components such as carbon monoxide (CO), carbon dioxide ($CO_2$), unburned hydrocarbons (UHC), nitrogen oxides (NO, $NO_2$, $N_2O_3$), smoke and soot or particulate matter. Different combustion chamber designs have been developed to minimise the production of these undesirable combustion product components. One of these combustion chamber designs uses staged combustion of the fuel. A staged combustion chamber includes first, or primary, stage burners and second, or secondary, stage burners. At low speed and/or low power conditions fuel is supplied to the primary stage burners only. At high speed and/or high power conditions fuel is supplied to the primary stage burners and to the secondary stage burners to maintain the undesirable combustion products within desired limits.

It is difficult to control the supply of fuel to the primary and secondary stage burners to allow efficient thermal operation of the gas turbine engine while simultaneously minimising the production of the undesirable combustion product components. It is to be noted that operating with the secondary fuel at low combustion temperatures to reduce the emissions of NOx, may result in incomplete combustion or partial combustion, which may lead to the production of excessive amounts of unburned hydrocarbons (UHC) and carbon monoxide (CO) in addition to producing lower power and lower thermal efficiency. On the contrary it is to be noted that operating without the secondary fuel at high combustion temperatures will reduce the emissions of carbon monoxide (CO) and unburned hydrocarbons (UHC) but often results in higher emissions of NOx and smoke.

Currently the best practice is to supply fuel to the secondary stage burners based on either a sensed measurement of the temperature at the inlet to the combustion chamber or a derived measurement of the temperature at the outlet of the combustion chamber. However, both methods are likely to be inaccurate and rely on certain assumptions.

Therefore the present invention seeks to provide a novel apparatus and a novel method for controlling the supply of fuel to a combustion chamber which reduces or overcomes the above mentioned problem.

STATEMENTS OF INVENTION

Accordingly the present invention provides a combustion chamber and an apparatus for controlling the supply of fuel to the combustion chamber, the combustion chamber comprising at least one primary stage fuel burner to supply fuel into a primary combustion zone of the combustion chamber, at least one secondary stage fuel burner to supply fuel into a secondary combustion zone of the combustion chamber, the apparatus comprising at least one sensor positioned downstream of the combustion chamber, the at least one sensor being arranged to measure the concentration, or the concentration gradient, of one or more of carbon monoxide, carbon dioxide, unburned hydrocarbons, oxygen, water, nitrogen oxides, smoke and soot or particulate matter, the at least one sensor being arranged to send the measurement of the concentration or concentration gradient of one or more of carbon monoxide, carbon dioxide, unburned hydrocarbons, oxygen, water, nitrogen oxides, smoke soot and particulate matter to a processor, the processor being arranged to compare the measured concentration or concentration gradient of one or more of carbon monoxide, carbon dioxide, unburned hydrocarbons, oxygen, water, nitrogen oxides, smoke, soot and particulate matter with a first threshold value and a second threshold value, the processor being arranged to supply more fuel to the at least one primary stage fuel burner if the measured concentration or concentration gradient is higher than the first threshold value, the processor being arranged to supply more fuel to the at least one secondary stage fuel burner if the measured concentration or concentration gradient is higher than the second threshold value, and the processor being arranged to maintain the supply of fuel to the at least one primary stage fuel burner and to the at least one secondary stage fuel burner if the measured concentration or concentration gradient is lower than the first threshold value and is lower than the second threshold value.

The processor may be arranged to compare the measured concentration or concentration gradient of one or more of carbon monoxide and unburned hydrocarbons with the first threshold value, the processor being arranged to compare the measured concentration or concentration gradient of one or more of nitrogen oxides and smoke with the second threshold value, the processor being arranged to supply more fuel to the at least one primary stage fuel burner if the measured concentration or concentration gradient of one or more of carbon monoxide and unburned hydrocarbons is higher than the first threshold value, the processor being arranged to supply more fuel to the at least one secondary stage fuel burner if the measured concentration or concentration gradient of one or more of nitrogen oxides and smoke is higher than the second threshold value, and the processor being arranged to maintain the supply of fuel to the at least one primary stage fuel burner and to the at least one secondary stage fuel burner if the measured concentration or concentration gradient of one or more of carbon monoxide and unburned hydrocarbons is lower than the first threshold value and if the measured concentration or concentration gradient of one or more of nitrogen oxides and smoke is lower than the second threshold value.

The processor may compare the measured concentration or concentration gradient of one or more of carbon monoxide and unburned hydrocarbons with the first threshold value to determine if the combustion chamber is operating too lean and/or is operating too inefficiently. The processor may compare the measured concentration or concentration gradient of one or more of nitrogen oxides and smoke with the second threshold value to determine if the combustion chamber is operating too rich and/or is producing undesirable combustion products.

The combustion chamber may be a gas turbine engine combustion chamber.

The at least one sensor may be positioned downstream of the combustion chamber and upstream of a high pressure turbine. The at least one sensor may be positioned downstream of a high pressure turbine and upstream of a low pressure turbine. The at least ones sensor may be positioned downstream of a high pressure turbine and upstream of an intermediate pressure turbine. The at least ones sensor may be positioned downstream of an intermediate pressure turbine and upstream of a low pressure turbine. The at least one sensor may be positioned downstream of the low pressure turbine.

The gas turbine engine may be an aero gas turbine engine, a marine gas turbine engine or an industrial gas turbine engine.

The gas sensor may be one or more of a Lambda sensor, a chemical reaction type sensor or a laser detector type sensor.

The present invention also provides a method controlling the supply of fuel to a combustion chamber, the combustion chamber comprising at least one primary stage fuel burner to supply fuel into a primary combustion zone of the combustion chamber, at least one secondary stage fuel burner to supply fuel into a secondary combustion zone of the combustion chamber, the method comprising measuring the concentration, or the concentration gradient, of one or more of carbon monoxide, carbon dioxide, unburned hydrocarbons, oxygen, water, nitrogen oxides, smoke, soot and particulate matter at a position downstream of the combustion chamber, comparing the measured concentration or concentration gradient of one or more of carbon monoxide, carbon dioxide, unburned hydrocarbons, oxygen, water, nitrogen oxides, smoke, soot and particulate matter with a first threshold value and a second threshold value, supplying more fuel to the at least one primary stage fuel burner if the measured concentration or concentration gradient is higher than the first threshold value, supplying more fuel to the at least one secondary stage fuel burner if the measured concentration or concentration gradient is higher than the second threshold value and maintaining the supply of fuel to the at least one primary stage fuel burner and to the at least one secondary stage fuel burner if the measured concentration or concentration gradient is lower than the first threshold value and is lower than the second threshold value.

The method may comprise comparing the measured concentration or concentration gradient of one or more of carbon monoxide and unburned hydrocarbons with the first threshold value, comparing the measured concentration or concentration gradient of one or more of nitrogen oxides and smoke with the second threshold value, supplying more fuel to the at least one primary stage fuel burner if the measured concentration or concentration gradient of one or more of carbon monoxide and unburned hydrocarbons is higher than the first threshold value, supplying more fuel to the at least one secondary stage fuel burner if the measured concentration or concentration gradient of one or more of nitrogen oxides and smoke is higher than the second threshold value, and maintaining the supply of fuel to the at least one primary stage fuel burner and to the at least one secondary stage fuel burner if the measured concentration or concentration gradient of one or more of carbon monoxide and unburned hydrocarbons is lower than the first threshold value and if the measured concentration or concentration gradient of one or more of nitrogen oxides and smoke is lower than the second threshold value.

The method may comprise comparing the measured concentration or concentration gradient of one or more of carbon monoxide and unburned hydrocarbons with the first threshold value to determine if the combustion chamber is operating too lean and/or is operating too inefficiently. The method may comprise comparing the measured concentration or concentration gradient of one or more of nitrogen oxides and smoke with the second threshold value to determine if the combustion chamber is operating too rich and/or is producing undesirable combustion products.

The combustion chamber may be a gas turbine engine combustion chamber.

The method may comprise measuring the concentration, or the concentration gradient, of one or more of carbon monoxide, carbon dioxide, unburned hydrocarbons, oxygen, water, nitrogen oxides, smoke, soot and particulate matter at a position downstream of the combustion chamber and upstream of a high pressure turbine.

The method may comprise measuring the concentration, or the concentration gradient, of one or more of carbon monoxide, carbon dioxide, unburned hydrocarbons, oxygen, water, nitrogen oxides, smoke, soot and particulate matter at a position downstream of a high pressure turbine and upstream of a low pressure turbine.

The method may comprise measuring the concentration, or the concentration gradient, of one or more of carbon monoxide, carbon dioxide, unburned hydrocarbons, oxygen, water, nitrogen oxides, smoke, soot and particulate matter at a position downstream of an intermediate pressure turbine and upstream of a low pressure turbine.

The method may comprise measuring the concentration, or the concentration gradient, of one or more of carbon monoxide, carbon dioxide, unburned hydrocarbons, oxygen, water, nitrogen oxides, smoke, soot and particulate matter at a position downstream of a low pressure turbine.

The method may comprise measuring the concentration, or the concentration gradient, of one or more of carbon monoxide, carbon dioxide, unburned hydrocarbons, oxygen, water, nitrogen oxides, smoke, soot and particulate matter using one or more of a Lambda sensor, a chemical reaction type sensor or a laser detector type sensor.

The gas turbine engine may be an aero gas turbine engine, a marine gas turbine engine or an industrial gas turbine engine.

BRIEF DESCRIPTION OF THE DRAWINGS

The present invention will be more fully described by way of example with reference to the accompanying drawings, in which:—

DETAILED DESCRIPTION

Figure 1:
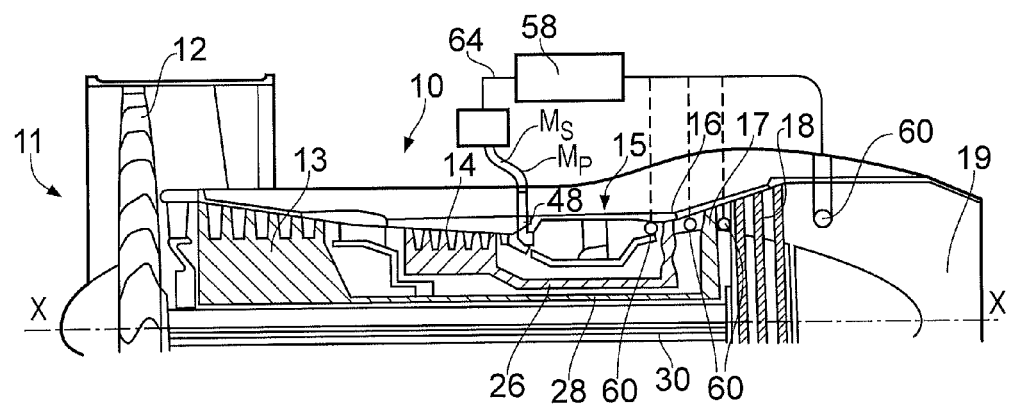
FIG. 1 is partially cut away view of a turbofan gas turbine engine having an apparatus for controlling the supply of fuel to a combustion chamber according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
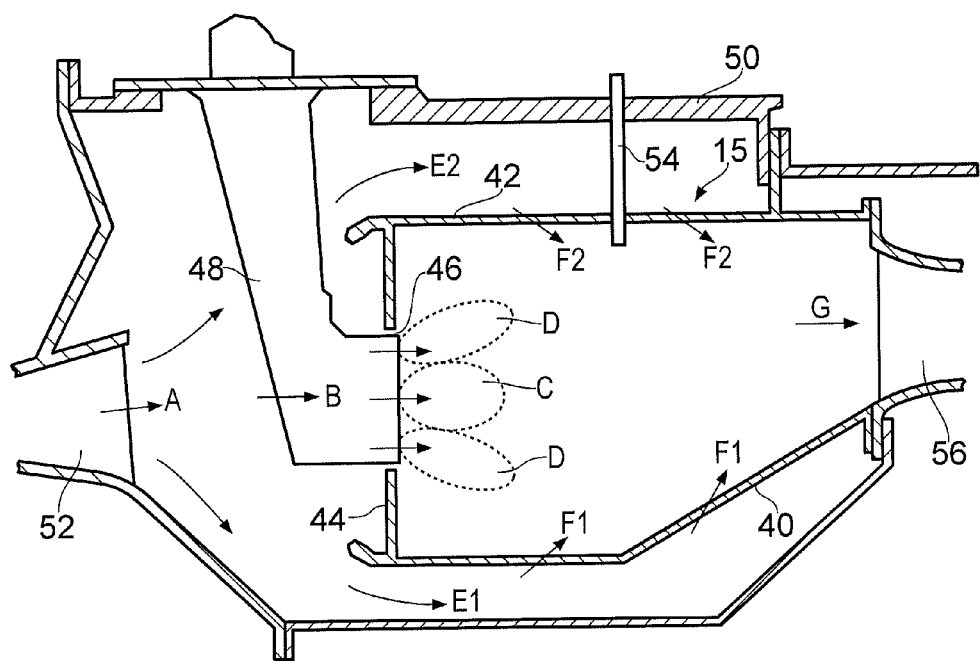
FIG. 2 is an enlarged cross-sectional view of the combustion chamber shown in FIG. 1.

The combustion chamber 15, as shown more clearly in FIG. 2, is an annular combustion chamber and comprises a radially inner annular wall structure 40, a radially outer annular wall structure 42 and an upstream end wall structure 44. The upstream end of the radially inner annular wall structure 40 is secured to the upstream end wall structure 44 and the upstream end of the radially outer annular wall structure 42 is secured to the upstream end wall structure 44. The upstream end wall structure 44 has a plurality of circumferentially spaced apertures 46 and each aperture 46 has a respective one of a plurality of fuel injectors 48 located therein. The fuel injectors 48 are arranged to supply fuel into the annular combustion chamber 15 during operation of the gas turbine engine 10. The combustion chamber 15 is surrounded by an annular combustion chamber casing 50. The combustion chamber 15 also has one or more igniters 54.

The combustion chamber 15 has a dual flame combustion zone, a primary combustion zone C and a secondary combustion zone D, contained between the radially inner annular wall structure 40 and the radially outer annular wall structure 42. Each fuel injector 48 comprises a secondary fuel injector (not shown) and a primary fuel injector (not shown) which are arranged concentrically with each other. However the secondary fuel injector and the primary fuel injector may be disposed in other suitable arrangements relative to the other. As mentioned previously the combustion chamber 15 is supplied with compressed air A from the high pressure compressor 14 and the compressed air A is discharged from the high pressure compressor 14 through a diffuser 52. A first portion B of the compressed air A flows into the fuel injectors 48 where fuel is injected and mixed with the air to form a fuel-air mixture that is supplied into the primary combustion zone C and the secondary combustion zone D. A first minor portion E1 of the compressed air A flows radially within the radially inner annular wall structure 40 and is supplied as cooling air F1 through cooling apertures in the radially inner annular wall structure 40 to provide cooling of the radially inner annular wall structure 40. A second minor portion E2 of the compressed air A flows radially outside the radially outer annular wall structure 42 and is supplied as cooling air F2 through cooling apertures in the radially outer annular wall structure 42 to provide cooling of the radially outer annular wall structure 42.

Each fuel injector 48 comprises a pre-filming primary fuel injector and a pre-filming secondary fuel injector. The pre-filming primary fuel injector comprises an arrangement to supply primary fuel onto an inner surface of an annular member, an inner air swirler to supply air through a duct defined by the inner surface of the annular member and an outer air swirler arranged around the annular member to supply air around the annular member such that the two flows of air atomise the primary fuel. The secondary pre-filming fuel injector comprises an arrangement to supply secondary fuel onto an inner surface of a second annular member, a second inner air swirler to supply air through a duct defined by the inner surface of the second annular member and a second outer air swirler arranged around the second annular member to supply air around the second annular member such that the two flows of air atomise the secondary fuel. An annular splitter member is positioned between the outer air swirler and the second inner air swirler. The air swirlers may be axial flow air swirlers. The annular member, the second annular member, the annular splitter and the air swirlers may all be arranged coaxially. Alternatively each fuel injector may also comprise a further annular splitter provided around the annular splitter, between the annular splitter and the second inner air swirler and an air swirler is provided between the annular splitter and the further annular splitter. Other suitable types of fuel injector may be used, e.g. the primary fuel injector and the secondary fuel injector may not be pre-filming types of fuel injector.

At low power settings fuel is only supplied to the primary fuel injector of each fuel injector 48 so that only the primary combustion zone C is supplied with fuel. When the demand for additional power reaches a predetermined level, "the staging point", fuel is also supplied to the secondary fuel injector of each fuel injector 48 so that the primary combustion zone C and the secondary combustion zone D are supplied with fuel. At high power settings both the primary fuel injector and the secondary fuel injector of each fuel injector 48 is supplied with fuel providing the primary combustion zone C and the secondary combustion zone D respectively with combustible fuel-air mixtures. Each combustion zone C and D operates with its proper fuel to air ratio F/A. The fuel-air mixture in the combustion chamber 15 is ignited using the igniter 54. The resulting combustion products G flow in an axial downstream direction from the downstream end of the combustion chamber 15 through a stage of turbine nozzle guide vanes 56 into the high pressure turbine 16.

The present invention provides a fuel controller 58 which provides a schedule which controls the distribution of fuel between the primary combustion zone C and the secondary combustion zone D directly making use of the concentration, or concentration gradient, of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter. The present invention measures the concentration, or concentration gradient, of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter singularly or collectively, taken downstream of the combustion chamber 15 using at least one gas sensor 60 which is capable of measuring at least one of the components or chemical compounds existing in the exhaust gases discharged from the combustion chamber 15. The at least one gas sensor 60 is conveniently positioned in the vicinity of the exit section of the low pressure turbine 18, e.g. downstream of the low pressure turbine 18, as shown in FIG. 1. However the at least one gas sensor 60 may be located in any other suitable location in the gas turbine engine downstream of the combustion chamber 15. The at least one gas sensor 60 may be positioned downstream of the combustion chamber 15 and upstream of the high pressure turbine 16. The at least one gas sensor 60 may be positioned downstream of the high pressure turbine 16 and upstream of the intermediate pressure turbine 17. The at least one gas sensor 60 may be positioned downstream of the intermediate pressure turbine 17 and upstream of the low pressure turbine 18. The at least one gas sensor 60 may be positioned at any other position downstream of the combustion chamber 15 and upstream of the low pressure turbine 18. Although reference is made herein to a single gas sensor, it may be possible to use a plurality of gas sensors.

Figure 3:
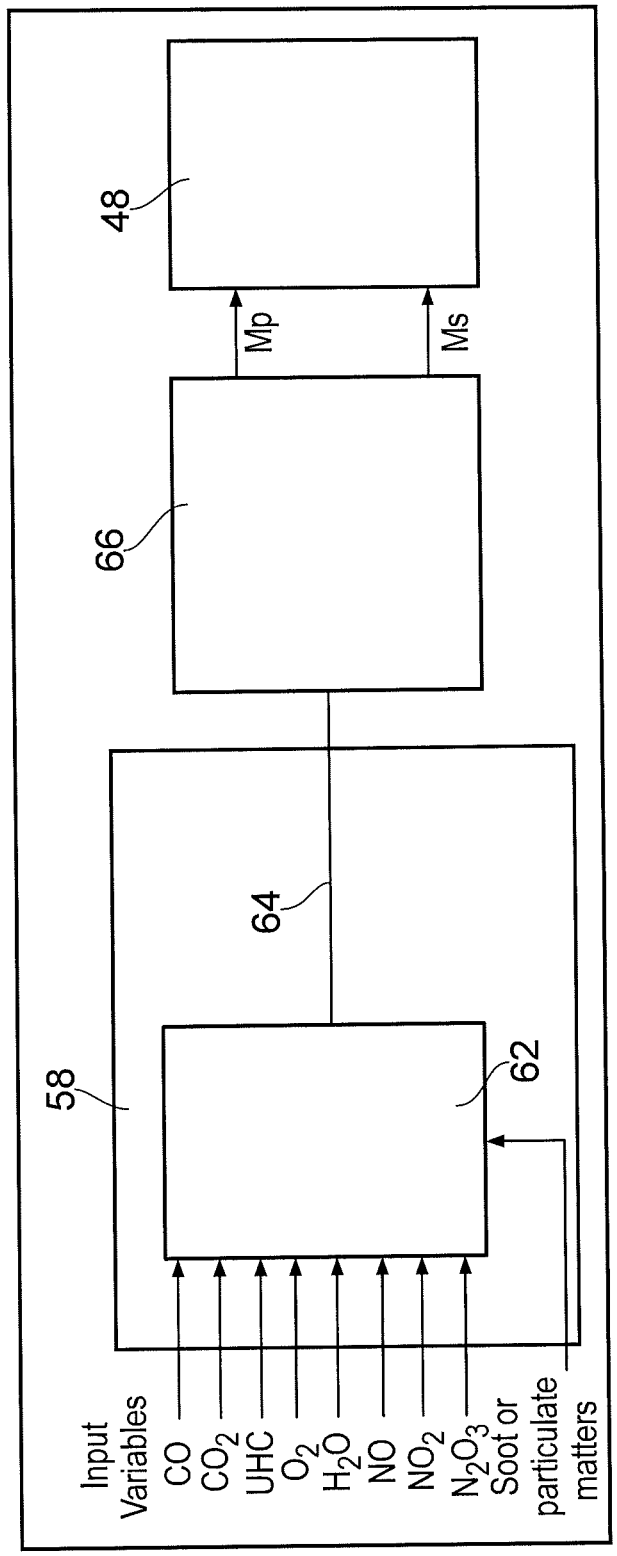
FIG. 3 is a schematic representation of an apparatus for controlling the supply of fuel to the combustion chamber according to the present invention.

The fuel controller 58 is conveniently positioned on the fan casing, or in any other relatively cool position on the turbofan gas turbine engine 10. The fuel controller 58 is arranged to receive measurements of the concentration, or concentration gradient, of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter singularly or collectively, in the combustion chamber 15 exhaust gases taken downstream of the combustion chamber 15 from the at least one gas sensor 60. These measurements are input variables into the fuel controller 58, as shown in FIG. 3. The fuel controller 58 may be the EEC, electronic engine controller, of the gas turbine engine 10. The fuel controller, or EEC, 58 as shown in FIG. 3 includes an algorithm 62 which uses these measurements to produce control signals 64 which control the fuel flow split between the primary fuel injector and the secondary fuel injector of each fuel injector 48, e.g. which control the fuel split between, the proportion of fuel supplied to, the primary combustion zone C and the secondary zone D. The control signals 64 are supplied from the fuel controller 58 to the fuel system 66 so that the fuel system 66 supplies the primary fuel flow Mp and the secondary fuel flow Ms to the primary fuel injector and the secondary fuel injector respectively of each fuel injector 48. The fuel system 66 includes hardware which is actuated to deliver the primary fuel flow Mp and the secondary fuel flow Ms to the fuel injectors 48.

Figure 4:
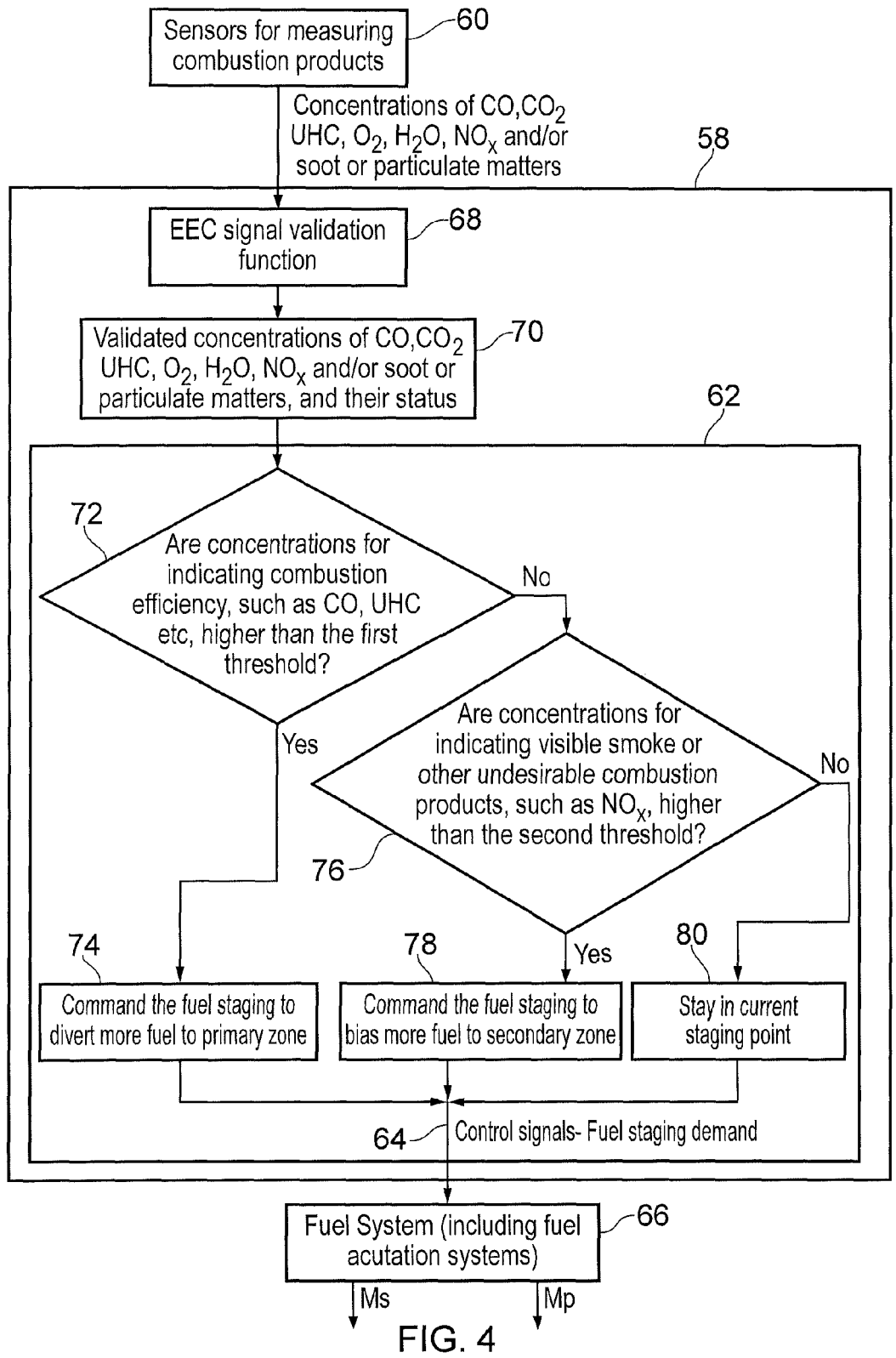
FIG. 4 is an algorithm used in the apparatus for controlling the supply of fuel to the combustion chamber according to the present invention.

FIG. 4 is a flow diagram of an algorithm function included in the fuel controller 58 of FIG. 3 for controlling the fuel flow split between the primary fuel injectors and the secondary fuel injectors of the fuel injectors 48 so as to control the fuel flow split between, the proportion of fuel supplied to, the primary combustion zone C and the secondary zone D. The gas sensors 60 measure the concentration, or concentration gradient, of the combustion chamber 15 exhaust gases. These measurements are supplied as input variables into the fuel controller, EEC, 58. Within the fuel controller, EEC, 58 these measurements are firstly validated in a signal validation function 68. The validated concentration(s), or concentration gradient(s) and their status 70 are input into the algorithm 62 of the fuel controller, EEC, 58. Within the algorithm 62, the control software 72 compares the validated concentration, or concentration gradient, with a first threshold to determine whether the validated concentration, or concentration gradient, of one or more of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter indicates that the combustion chamber is operating too inefficiently and/or operating too lean. The concentration, or concentration gradient, of carbon monoxide (CO) and/or unburned hydrocarbons (UHC) in particular may be used to determine if the combustion chamber is operating too inefficiently and/or is operating too lean by having a concentration or concentration gradient higher than the first threshold. A concentration, or concentration gradient, higher than the first threshold is recovered by commanding 74 the fuel staging to bias, or divert, more fuel to the primary combustion zone C. If the concentration, or concentration gradient, is lower than the first threshold, the control software 72 compares the validated concentration, or concentration gradient, with the second threshold to determine whether the validated concentration, or concentration gradient, of one or more of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter indicates that the combustion chamber is operating too rich and/or is producing undesirable combustion products. The concentration, or concentration gradient, of nitrogen oxides (NO, $NO_2$, $N_2O_3$) and/or smoke in particular may be used to determine if the combustion chamber is operating too rich and/or is producing undesirable combustion products by having a concentration or concentration gradient higher than the second threshold. A concentration, or concentration gradient, higher than the second threshold is recovered by commanding 74 the fuel staging to bias, or divert, more fuel to the secondary combustion zone D. The control software 76 commands 80 the fuel staging to stay in the current schedule if the concentrations of the combustion products are within the required thresholds, lower than the first threshold and lower than the second threshold. Depending on the position where the gas sensors are installed in the gas turbine engine 10, other factors (not shown), such as the cooling air effects, could be added into the fuel controller, EEC, 58 software.

The fuel staging method can benefit from the use of a multi-component measurement technique. Relying on the direct measurements of components or chemical compounds in the combustion chamber 15 exhaust gases, the simultaneous measurement of multiple chemical species makes available a plurality of staging parameters. It can be exploited, for example, in finely controlling the combustion chamber 15 near to the staging point by minimising pollutant emissions. The method may use a quantifiable measurement of the chemical species or the method may use a change in the amount of chemical species or the chemical concentration gradient.

The fuel schedule method consists in distributing the fuel between the primary zone C and the secondary zone D directly making use of any one or more of the concentrations of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter. The measurement of the concentrations of carbon monoxide (CO), carbon dioxide ($CO_2$), unburned hydrocarbons (UHC), oxygen ($O_2$), water ($H_2O$), nitrogen oxides (NO, $NO_2$, $N_2O_3$), smoke, soot or particulate matter may be singularly, or collectively, taken downstream of the combustion chamber 15 by means of a gas sensor 60 which may be capable of measuring the composition of at least one of the components in the exhaust gases exiting the combustion chamber 15.

It is preferred to locate the gas sensor 60 downstream of the low pressure turbine 18, however, the sensor 48 may be located elsewhere in the turbofan gas turbine engine 10 for example immediately downstream of the combustion chamber 15, or at any suitable position downstream of the combustion chamber 15 and upstream of the low pressure turbine 18. The gas sensor 60 may be a gas sensor which measures the concentration of a single chemical compound, or species, or the gas sensor 60 may be a gas sensor which measures the concentration of a plurality of chemical compounds, or species. It may be possible to provide a number of different gas sensors 60 each of which measures the concentration of a different chemical compound, or species. It may be possible to provide a number of different gas sensors 60 some of which measure the concentration of a single chemical compound or species and some of which measure the concentration of a plurality of different chemical compounds, or species.

The gas sensor 60 may be a Lambda sensor, a chemical reaction type sensor, a laser detector type of sensor or if there is a plurality of gas sensors 60 any combination of these sensors may be used or any combination of derivatives of these gas sensors 60 may be used.

The fuel schedule method and the associated control logic along with the algorithm control function for a dual flame combustor have some advantages with respect to the prior art. The present invention enables the possibility to rely on the fuel staging point on the concentration of pollutants in the combustion chamber exhaust gases and allows the fuel schedule to be optimised in accordance with the emission constraints. Moreover such a feature improves the control of weak extinction performance of the combustion chamber. The weak extinction limit indicated by the primary air to fuel ratio AFR, the concentrations or concentration gradient of chemical compound in the combustion chamber exhaust gases may be directly linked to the primary air to fuel ratio. A further advantage of the fuel staging method of the present invention relates to the effects of deterioration of the gas turbine engine on the weak extinction limit and the emission of visible smoke. These parameters typically vary because of the ageing of the gas turbine engine as a whole. The direct measurement of the concentration of chemical compound(s), or the concentration gradient of a chemical compound(s), in the combustion chamber exhaust gases and their use as fuel staging parameters may lead to a self-adapting system without the need to tune the fuel staging parameters according to the age and/or the accumulated working life of the gas turbine engine. This enables the use of a less complex gas turbine engine control system with consequential reductions in cost and weight of the gas turbine engine control system. Finally a limited rate of error is associated with the use of the concentration(s) or concentration gradient(s) of the chemical compounds in the combustion chamber exhaust gases as a fuel staging control parameter(s). Except for the error due to the measurement of the concentration(s) or concentration gradient(s) of the chemical compounds there are no inaccuracies in the method for synthesising the staging parameter. Other methods used to synthesise the fuel staging parameter are based on certain assumptions which may generate extra errors.

The fuel controller 58 is thus a processor which is arranged to compare the measured concentration, or concentration gradient, of one or more of carbon monoxide (CO), carbon dioxide ($CO_2$), unburned hydrocarbons (UHC), oxygen ($O_2$), water $H_2O$, nitrogen oxides (NO, $NO_2$, $N_2O_3$), smoke, soot and particulate matter with a first threshold value and a second threshold value. The fuel controller 58, the processor, is arranged to supply more fuel, a greater proportion of the fuel, to the at least one primary stage fuel burner if the measured concentration or concentration gradient is higher than the first threshold value, the fuel controller 58, the processor, is arranged to supply more fuel, a greater proportion of the fuel, to the at least one secondary stage fuel burner if the measured concentration or concentration gradient is higher than the second threshold value. The fuel controller 58, the processor, is arranged to maintain the same supply of fuel to the at least one primary stage fuel burner and to the at least one secondary stage fuel burner, e.g. to maintain the same proportions of fuel supplied to the at least one primary stage fuel burner and the at least one secondary stage fuel burner, if the measured concentration or concentration gradient is lower than the first threshold value and is lower than the second threshold value.

The concentration, or concentration gradient, of carbon monoxide (CO) may be used alone to determine if the combustion chamber is operating too inefficiently and/or is operating too lean by having a concentration, or concentration gradient, higher than the first threshold. Alternatively the concentration, or concentration gradient, of unburned hydrocarbons (UHC) may be used alone to determine if the combustion chamber is operating too inefficiently and/or is operating too lean by having a concentration, or concentration gradient, higher than the first threshold.

The concentration, or concentration gradient, of carbon monoxide (CO) and the concentration, or concentration gradient, of unburned hydrocarbons (UHC) may be used to together to determine if the combustion chamber is operating too inefficiently and/or is operating too lean by having a total concentration, or total concentration gradient, higher than the first threshold. Alternatively the concentration, or concentration gradient, of carbon monoxide (CO) and the concentration, or concentration gradient, of unburned hydrocarbons (UHC) may be used to together to determine if the combustion chamber is operating too inefficiently and/or is operating too lean by having a concentration, or concentration gradient, of carbon monoxide (CO) higher than a respective first threshold for carbon monoxide and by having a concentration, or concentration gradient, of unburned hydrocarbons (UHC) higher than a respective first threshold for unburned hydrocarbons.

The concentration, or concentration gradient, of nitrogen oxide (NO) may be used alone to determine if the combustion chamber is operating too rich and/or is producing undesirable combustion products by having a concentration or concentration gradient higher than the second threshold. Alternatively the concentration, or concentration gradient, of nitrogen oxide ($NO_2$) may be used alone to determine if the combustion chamber is operating too rich and/or is producing undesirable combustion products by having a concentration or concentration gradient higher than the second threshold. In another alternative the concentration, or concentration gradient, of nitrogen oxide ($N_2O_3$) may be used alone to determine if the combustion chamber is operating too rich and/or is producing undesirable combustion products by having a concentration or concentration gradient higher than the second threshold. In a further alternative the concentration, or concentration gradient, of smoke be used alone to determine if the combustion chamber is operating too rich and/or is producing undesirable combustion products by having a concentration or concentration gradient higher than the second threshold.

The concentration, or concentration gradient, of nitrogen oxide (NO), the concentration, or concentration gradient of, nitrogen oxide ($NO_2$), the concentration, or concentration gradient, of nitrogen oxide ($N_2O_3$) and the concentration, or concentration gradient, of smoke may be used together to determine if the combustion chamber is operating too rich and/or is producing undesirable combustion products by having a total concentration, or concentration gradient, higher than the second threshold. Alternatively the concentration, or concentration gradient, of nitrogen oxide (NO), the concentration, or concentration gradient of, nitrogen oxide ($NO_2$), the concentration, or concentration gradient, of nitrogen oxide ($N_2O_3$) and the concentration, or concentration gradient, of smoke may be used together to determine if the combustion chamber is operating too rich and/or is producing undesirable combustion products by having a concentration, or concentration gradient, of nitrogen oxide (NO) higher than a respective second threshold for nitrogen oxide (NO), by having a concentration, or concentration gradient, of nitrogen oxide ($NO_2$) higher than a respective second threshold for nitrogen oxide ($NO_2$), by having a concentration, or concentration gradient, of nitrogen oxide ($N_2O_3$) higher than a respective second threshold for nitrogen oxide ($N_2O_3$), and by having a concentration, or concentration gradient, of smoke higher than a respective second threshold for smoke.

The present invention may measure and validate the concentration, or concentration gradient, of a single compound and the concentration, or concentration gradient, of this single compound may be compared with a single first threshold and/or a single second threshold. The present invention may measure and validate the concentration, or concentration gradient, of a number of compounds and the concentration, or concentration gradient, of each compound may be compared with a respective first threshold and/or a respective second threshold. The present invention may measure and validate the concentration, or concentration gradient, of a number of compounds and the total concentration, or total concentration gradient, of all of the compounds may be compared with a single first threshold and/or a single second threshold.

The present invention may measure and validate the concentration, or concentration gradient, of one particular compound and compare the concentration, or concentration gradient, of that particular compound with the first threshold and may measure and validate the concentration, or concentration gradient, of a different compound and compare the concentration, or concentration gradient, of the different compound with the second threshold. The present invention may measure and validate the concentration, or concentration gradient, of one particular compound and compare the concentration, or concentration gradient, of that particular compound with the first threshold and may compare the concentration, or concentration gradient, of the particular compound with the second threshold.

Although the present invention has been described with reference to a turbofan gas turbine engine it may be equally applicable to other aircraft gas turbine engines, e.g. a turbojet gas turbine engine or a turboprop gas turbine engine or turboshaft gas turbine engine having staged combustion chambers. The present invention is equally applicable to marine, automotive and industrial gas turbine engines having staged combustion chambers.

The invention claimed is:

1. A combustion chamber and an apparatus for controlling the supply of fuel to the combustion chamber, the combustion chamber comprising at least one primary stage fuel burner to supply fuel into a primary combustion zone of the combustion chamber, at least one secondary stage fuel burner to supply fuel into a secondary combustion zone of the combustion chamber, the apparatus comprising:
 a processor;
 at least one sensor positioned downstream of the combustion chamber, the at least one sensor being arranged to measure the concentration, or the concentration gradient, of one or more of carbon monoxide, carbon dioxide, unburned hydrocarbons, oxygen, water, nitrogen oxides, smoke, soot or particulate matter, the at least one sensor being arranged to send the measurement of the concentration or concentration gradient to the processor,
 the processor being arranged to compare the measured concentration or concentration gradient with a first threshold value and a second threshold value,
 the processor being arranged to supply more fuel to the at least one primary stage fuel burner if the measured concentration or concentration gradient is higher than the first threshold value,
 the processor being arranged to supply more fuel to the at least one secondary stage fuel burner if the measured concentration or concentration gradient is higher than the second threshold value, and
 the processor being arranged to maintain the supply of fuel to the at least one primary stage fuel burner and to the at least one secondary stage fuel burner if the measured concentration or concentration gradient is lower than the first threshold value and is lower than the second threshold value.

2. The combustion chamber and apparatus as claimed in claim 1 wherein
 the processor being arranged to compare the measured concentration or concentration gradient of one or more of carbon monoxide and unburned hydrocarbons with the first threshold value,
 the processor being arranged to compare the measured concentration or concentration gradient of one or more of nitrogen oxides and smoke with the second threshold value,
 the processor being arranged to supply more fuel to the at least one primary stage fuel burner if the measured concentration or concentration gradient of one or more of carbon monoxide and unburned hydrocarbons is higher than the first threshold value,
 the processor being arranged to supply more fuel to the at least one secondary stage fuel burner if the measured concentration or concentration gradient of one or more of nitrogen oxides and smoke is higher than the second threshold value, and
 the processor being arranged to maintain the supply of fuel to the at least one primary stage fuel burner and to the at least one secondary stage fuel burner if the measured concentration or concentration gradient of one or more of carbon monoxide and unburned hydrocarbons is lower than the first threshold value and if the measured concentration or concentration gradient of one or more of nitrogen oxides and smoke is lower than the second threshold value.

3. The combustion chamber and apparatus as claimed in claim 1 wherein the combustion chamber is a gas turbine engine combustion chamber.

4. The combustion chamber and apparatus as claimed in claim 3 wherein the at least one sensor is positioned downstream of the combustion chamber and upstream of a high pressure turbine.

5. The combustion chamber and apparatus as claimed in claim 3 wherein the at least one sensor is positioned downstream of a high pressure turbine and upstream of a low pressure turbine.

6. The combustion chamber and apparatus as claimed in claim 5 wherein the at least one sensor is positioned downstream of an intermediate pressure turbine and upstream of a low pressure turbine.

7. The combustion chamber and apparatus as claimed in claim 3 wherein the at least one sensor is positioned downstream of a low pressure turbine.

8. The combustion chamber and apparatus as claimed in claim 3 wherein the gas turbine engine is an aero gas turbine engine, a marine gas turbine engine or an industrial gas turbine engine.

9. The combustion chamber and apparatus as claimed in claim 1 wherein the gas sensor is one or more of a Lambda sensor, a chemical reaction sensor or a laser detector sensor.

10. A method controlling the supply of fuel to a combustion chamber, the combustion chamber comprising at least one primary stage fuel burner to supply fuel into a primary combustion zone of the combustion chamber, at least one secondary stage fuel burner to supply fuel into a secondary combustion zone of the combustion chamber, the method comprising:
measuring the concentration, or the concentration gradient, of one or more of carbon monoxide, carbon dioxide, unburned hydrocarbons, oxygen, water, nitrogen oxides, smoke, soot and particulate matter at a position downstream of the combustion chamber,
comparing the measured concentration or concentration gradient with a first threshold value and a second threshold value,
supplying more fuel to the at least one primary stage fuel burner if the measured concentration or concentration gradient is higher than the first threshold value,
supplying more fuel to the at least one secondary stage fuel burner if the measured concentration or concentration gradient is higher than the second threshold value; and
maintaining the supply of fuel to the at least one primary stage fuel burner and to the at least one secondary stage fuel burner if the measured concentration or concentration gradient is lower than the first threshold value and is lower than the second threshold value.

11. The method as claimed in claim 10 comprising:
comparing the measured concentration or concentration gradient of one or more of carbon monoxide and unburned hydrocarbons with the first threshold value,
comparing the measured concentration or concentration gradient of one or more of nitrogen oxides and smoke with the second threshold value,
supplying more fuel to the at least one primary stage fuel burner if the measured concentration or concentration gradient of one or more of carbon monoxide and unburned hydrocarbons is higher than the first threshold value,
supplying more fuel to the at least one secondary stage fuel burner if the measured concentration or concentration gradient of one or more of nitrogen oxides and smoke is higher than the second threshold value, and
maintaining the supply of fuel to the at least one primary stage fuel burner and to the at least one secondary stage fuel burner if the measured concentration or concentration gradient of one or more of carbon monoxide and unburned hydrocarbons is lower than the first threshold value and if the measured concentration or concentration gradient of one or more of nitrogen oxides is lower than the second threshold value.

12. The method as claimed in claim 10 wherein the combustion chamber is a gas turbine engine combustion chamber.

13. The method as claimed in claim 12 comprising measuring the concentration, or the concentration gradient, of one or more of carbon monoxide, carbon dioxide, unburned hydrocarbons, oxygen, water, nitrogen oxides, smoke, soot and particulate matter at a position downstream of the combustion chamber and upstream of a high pressure turbine.

14. The method as claimed in claim 12 comprising measuring the concentration, or the concentration gradient, of one or more of carbon monoxide, carbon dioxide, unburned hydrocarbons, oxygen, water, nitrogen oxides, smoke, soot and particulate matter at a position downstream of a high pressure turbine and upstream of a low pressure turbine.

15. The method as claimed in claim 14 comprising measuring the concentration, or the concentration gradient, of one or more of carbon monoxide, carbon dioxide, unburned hydrocarbons, oxygen, water, nitrogen oxides, smoke, soot and particulate matter at a position downstream of an intermediate pressure turbine and upstream of a low pressure turbine.

16. The method as claimed in claim 12 comprising measuring the concentration, or the concentration gradient, of one or more of carbon monoxide, carbon dioxide, unburned hydrocarbons, oxygen, water, nitrogen oxides, smoke, soot and particulate matter at a position downstream of a low pressure turbine.

17. The method as claimed in claim 12 wherein the gas turbine engine is an aero gas turbine engine, a marine gas turbine engine or an industrial gas turbine engine.

18. The method as claimed in claim 10 comprising measuring the concentration, or the concentration gradient, of one or more of carbon monoxide, carbon dioxide, unburned hydrocarbons, oxygen, water, nitrogen oxides, smoke, soot and particulate matter using one or more of a Lambda sensor, a chemical reaction sensor or a laser detector sensor.

* * * * *